United States Patent
Chow

[11] 3,971,886
[45] July 27, 1976

[54] METHOD OF CONTROLLING A REFERENCE TEMPERATURE TO RESTORE DC LEVEL FOR A THERMAL IMAGING SYSTEM

[75] Inventor: Sen-Te Chow, Alexandria, Va.

[73] Assignee: The United States of America as represented by the Secretary of the Army, Washington, D.C.

[22] Filed: Apr. 1, 1975

[21] Appl. No.: 564,179

[52] U.S. Cl................... 178/7.1; 178/7.6; 178/DIG. 8; 178/DIG. 26; 250/347; 250/352
[51] Int. Cl.²......................................... H04N 5/14
[58] Field of Search ........ 178/6, 6.8, 7.1, 7.2, 178/DIG. 8, DIG. 14, DIG. 26; 250/347, 352

[56] References Cited
UNITED STATES PATENTS

| | | | |
|---|---|---|---|
| 3,126,447 | 3/1964 | Bendell | 178/DIG. 26 |
| 3,584,146 | 6/1971 | Cath et al. | 178/DIG. 26 |
| 3,751,586 | 8/1973 | Johansson | 178/DIG. 26 |

*Primary Examiner*—Robert L. Richardson
*Attorney, Agent, or Firm*—Nathan Edelberg; Max L. Harwell; Robert P. Gibson

[57] ABSTRACT

An automatically controlled reference temperature strip for sensing by detectors in a thermal imaging system. The signal in each video channel from each related detector is integrated to determine which detector is sensing the hottest target signal and to use the output of this hottest signal video channel for controlling said reference temperature strip.

7 Claims, 5 Drawing Figures

METHOD OF CONTROLLING A REFERENCE TEMPERATURE TO RESTORE DC LEVEL FOR A THERMAL IMAGING SYSTEM

The invention described herein may be manufactured, used, and licensed by or for the Government for governmental purposes without the payment to me of any royalty thereon.

BACKGROUND OF THE INVENTION

This invention is in the field of thermal imagers that detect infrared energy that is naturally emitted from targets at various temperatures. A problem with these imagers is that with RC (resistor-capacitor) coupling the cold signal is suppressed by the hot signal causing suppression streaking.

SUMMARY OF THE INVENTION

The present invention relates to a combined optical and electrical means for automatically providing a reference temperature level to detectors in a thermal imager in which the reference temperature is commensurate with the hot-test temperature target being viewed. An afocal lens gathers the scene being viewed at the input to the thermal imager. A field stop which provides a clamping reference temperature for the detectors is placed at the focal plain of the focal lens. The field stop temperature is controlled by an electrical cooler which is controlled by the most positive signal from the video channels.

DETAILED DESCRIPTION OF THE PREFERRED EMBODIMENT

In the application of thermal imagery for observing targets such as land vehicles or aircraft, the image reaching each detector in a thermal imaging system must periodically change. The image is changed in the present thermal imaging system by oscillating a parallel beam scan mirror moving the scene across objective lens at the input to detectors. In RC (resistor-capacitor) coupled video systems where no direct current component restoration is used, the decay and recovery of the transient response gives some detrimental effects such as signal fade out, cold target signals suppressed by hot target signals, and slow recovery of the cold target signal followed by the hot signal from the level below the black light level to its steady state valve. A loss in terrain or horizon detail results. The present invention comprises a DC (direct current) restoration means for restoring the DC level within video channels and an automatic clamping switch means for presenting a reference temperature during the dead time of the thermal imager scanner to provide maximum dynamic range of the target signal of interest.

Optically, the invention comprises a field stop reference temperature strip for all the detectors to view at the end of each scan, which is herein referred to as the dead time of the scanner. The reference temperature strip is placed at the focal plain of a reverse imaging afocal lens. The temperature of the reference temperature strip is controlled by integrating the video signal of each video channel and selecting the channel with the resulting maximum integrated average signal of the scanning line. The maximum integrated average signal is then applied to a thermo-electric cooler that, in turn, controls the field stop reference temperature to all of the detectors during dead time.

Figure 1A:
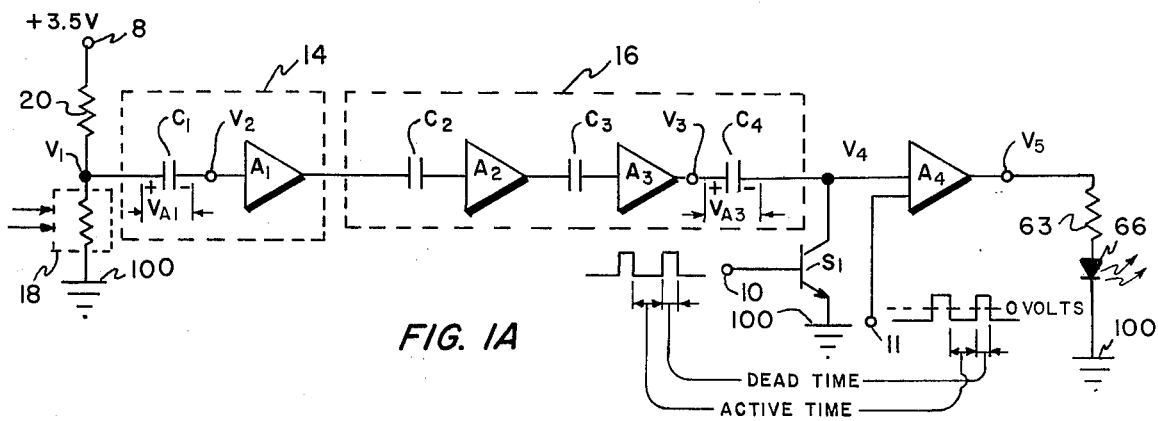
FIG. 1A shows a video channel of the thermal imager.
Figure 1B:
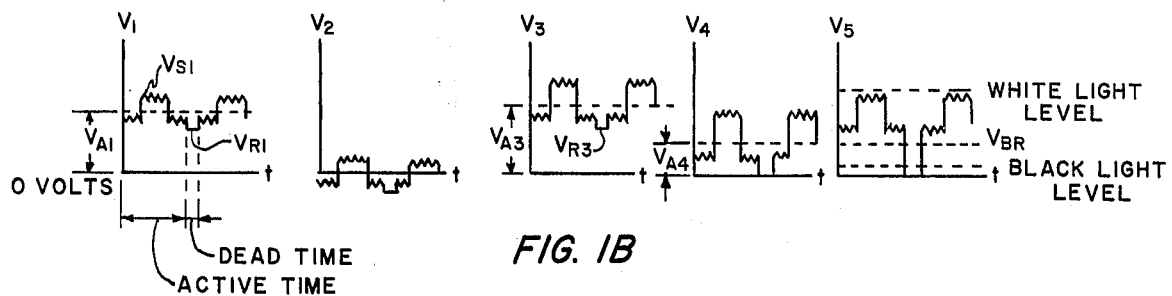
FIG. 1B illustrates voltage waveforms at nodes throughout the video channel of FIG. 1A.

Refer now to FIGS. 1A and 1B for an explanation of the voltage waveforms between a detector and the LED output of one of a plurality of video channels in the thermal image viewer. A detector 18 is placed in series with a detector bias resistor 20 between ground 100 and detector bias voltage 8. The video chain is explained with reference to a series of nodes therethrough in which the voltages are represented at those nodes. $V_1$ represents the voltage at node 1. Voltage $V_1$ comprises the input video signal $V_{S1}$ for active time of the thermal imaging scanner limited by a lower voltage of $V_{R1}$ which is the voltage representative of the reference temperature strip (to be explained more fully below) that the detector 18 views during dead time of the scanner. The voltage $V_1$ waveform is shown in FIG. 1B. Voltages $V_2$, $V_3$, $V_4$, $V_5$ which are respectively voltages at nodes 2, 3, 4, and 5 in the video chain of FIG. 1A, are also shown in FIG. 1B and will be discussed hereinbelow. A voltage $V_{A1}$ is the d.c. average voltage of $V_1$. The period during the lower limit $V_{R1}$ of voltage $V_1$ is the dead time of the scanner. The remainder of voltage $V_1$ is the active time signal from detector 18.

The voltage at node 2 does not have the average voltage $V_{A1}$ therein because it has been blocked out by capacitor $C_1$. Amplifiers $A_1$, $A_2$, and $A_3$ are inverting amplifiers that amplify voltage $V_2$ into voltage $V_3$, at node 3. Numeral 14 represents a preamplifier stage for the signal from detector, 18 and numeral 16 represents a post amplifier for the signal. It is noted here that even though voltages $V_3$ and $V_4$ are shown with the same polarity as voltage $V_2$, actually $V_3$ and $V_4$ are of opposite polarity. The voltages $V_3$ and $V_4$ are shown with the same polarity as $V_1$ $V_2$ for explanation purposes only. Voltage $V_3$ has a d.c. average voltage $V_{A3}$ that is caused by the Q-point of amplifier $A_3$. Voltage $V_{R3}$ represents the reference temperature voltage at node 3. Node 4, known as the sampling node, is grounded through switching transistor $S_1$ during the dead time of the scanner, Transistor $S_1$ is controlled by clamping pulses that are synchronized with the scanner. These clamping pulses are applied to terminal 10 connected to the base of transistor $S_1$. The resulting voltage waveform $V_4$ at node 4 is showm in FIG. 1B. Amplifier $A_4$ has a series of input pulses applied thereto at terminal 11 for disabling amplifier $A_4$ during the dead time. The resulting voltage waveform $V_5$ at the output of amplifier $A_4$, or node 5, is shown in FIG. 1B. Voltage $V_5$ is applied to light emitting diode 66 through resistor 63, with the LED connected to ground 100. The voltage waveform $V_5$ shows DC components of LED saturation represented by the white light level, the cut-off level of the LED represented by the black light level, and the brightness response level represented by $V_{BR}$. The d.c.

level voltage $V_{BR}$ of $V_5$ corresponds to the voltage $V_{A4}$ of $V_4$.

Figure 2A:
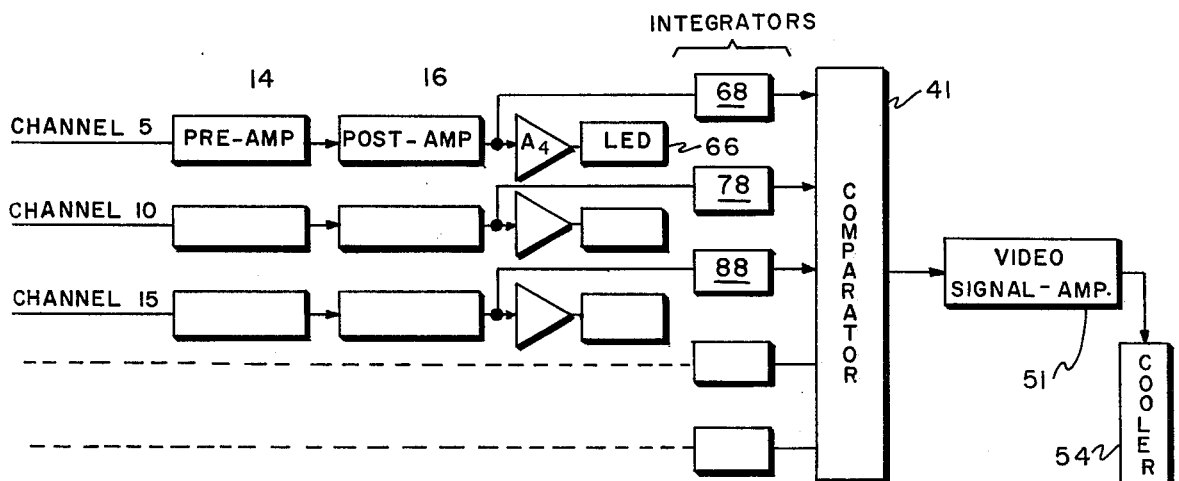
FIG. 2A is a schematic block diagram of the automatic field stop temperature control.
Figure 2B:
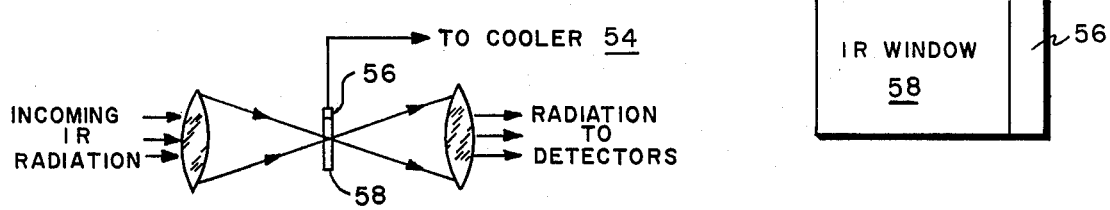
FIG. 2B illustrates the IR (infrared) window of FIG. 2A positioned with relation to the afocal lens.
Figure 3:
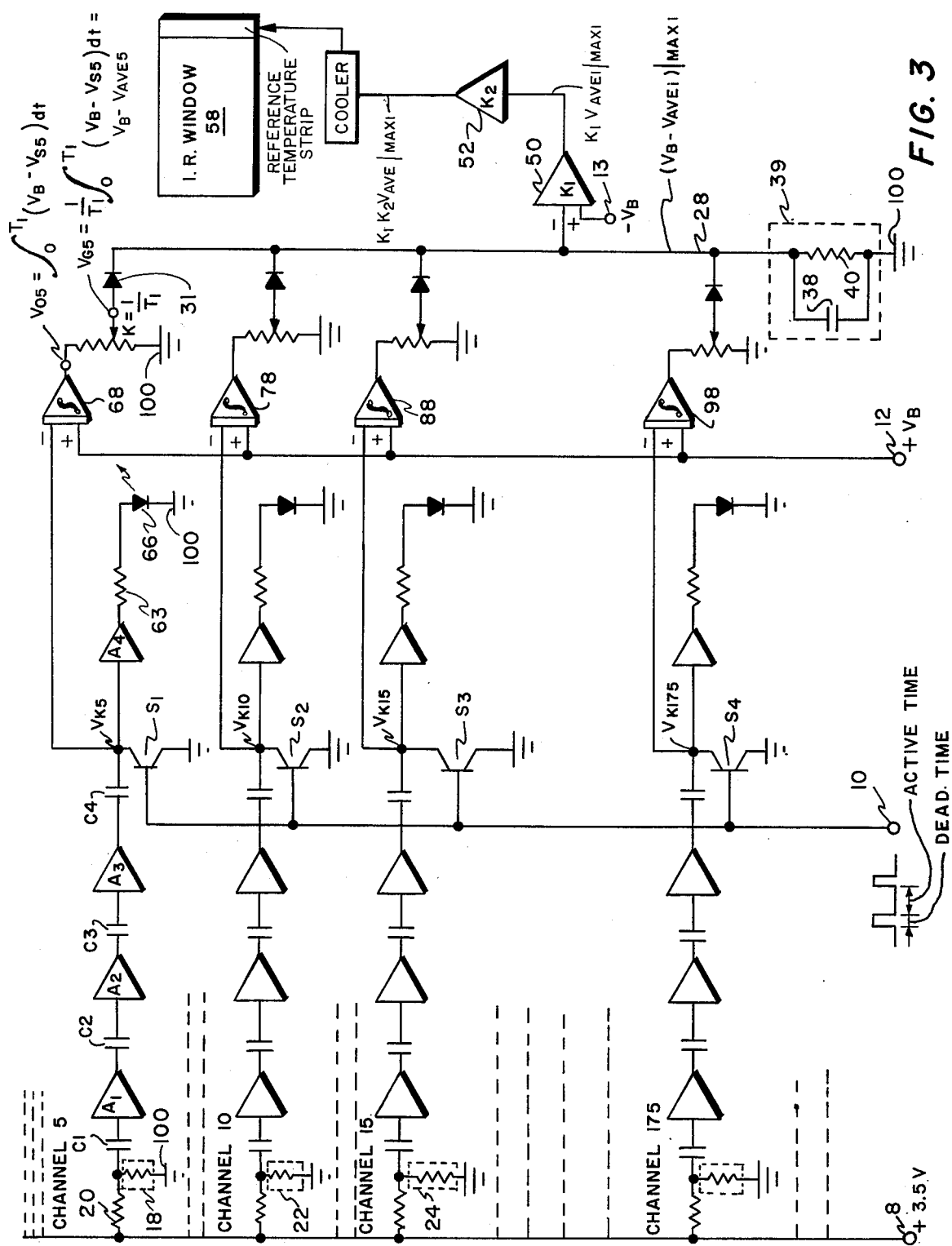
FIG. 3 is a schematic diagram of a common module DC restoration circuit for automatic field stop temperature control.

FIGS. 2A, 2B, and 3 should be referred to now for a close explanation of the present invention. FIG. 2A illustrates in block diagram form a common module thermal imaging system having DC restoration at the output of the system and automatically controlled temperature means for the reference temperature strip for preventing streaking of the target image. The temperature of the reference temperature strip is controlled by integrating the video signals in every fifth video channel, i.e. numbers 5, 10, 15, etc., and comparing in comparator 41 to determine which of these integrated video signals represents the hottest target. Only video channel number 5 has reference numerals therein. The components 14, 16, $A_4$, and 66 are as shown in FIG. 1A. Integrator 68 will be discussed with reference to FIG. 3. After the signal representing the hottest target has been compared in comparator 41, it is then amplified by amplifier 51. The amplified signal from 51 is applied to a thermo-electric cooler 54 which controls the reference temperature strip 56 positioned on one side of an IR window 58. The IR window 58 and strip 56 are positioned at the real image plane of an inverting afocal telescope comprising lens 59 and 61 as shown in FIG. 2B.

FIG. 3 shows an electrical schematic diagram of a common module thermal imaging system having DC resotration therein. A plurality of video channels are included in this common module thermal imaging system. Only channels 5, 10, 15, and 175 are shown to explain the operation of the present invention. However, there may be many more video channels than the 175. The unique means of automatic DC restoration of the thermal imaging system is discussed using numerals with reference to channel 5 when discussion is only required for one channel. Only the connections that are common to all video channels are at the point of novelty. Refer to FIG. 1B for a typical voltage wave $V_4$, which in FIG. 3 would be at either of nodes $V_{K5}$, $V_{K10}$, $V_{K15}$, $V_{K175}$, etc. The voltages at the nodes represented by the $V_K$ voltages have different amplitudes from node to node, with the difference caused by the various detectors 18, 22, 24, 26, etc. viewing targets of various temperatures. The voltages at the $V_K$ nodes are produced in the manner discussed above with reference to FIGS. 1A and 1B.

Clamping pulses, which are synchronized with the thermal imager scanner, are applied to terminal 10. Terminal 10 is connected to the bases on N-P-N switching transistors $S_1$, $S_2$, $S_3$, and $S_4$, representing the four video channels shown in FIG. 3. The positive clamping pulse at terminal 10 clamps the voltages at $V_{K5}$, $V_{K10}$, $V_{K15}$, $V_{K175}$, etc. to ground through the transistors. No signal will be applied to the negative input to integrator 68, 78, 88, or 98 during the dead time, allowing the integrators to recycle by discharging. The dead time is the time when the positive pulse is applied to the base of all the transistors and all $V_K$ nodes are grounded. The active time is the remaining time of each line period. During the dead time when the clamping transistors are clamped to ground, the RC time constant at the $V_K$ nodes are the product of the low output impedance of amplifier $A_3$, which is about 200 ohms, and the capacitance of capacitor $C_4$, typically 4.7 micro-farads. During the dead time $C_4$ is quickly charged to $V_{R3}$ (shown in FIG. 1B). During the active time, the transistors are opened and the RC time constant is the product of the input impedance of amplifier $A_4$, which is about 8,000 ohms, and the above noted capacitance of capacitor $C_4$. Clearly, with this much larger time constant, capacitor $C_4$ does not discharge much during the active time of the scan; thus retaining or restoring the DC component. The voltages at the $V_K$ nodes are approximately the same as waveform $V_4$ of FIG. 1B with some variation in amplitude from channel to channel because of various target temperatures. Clamping pulses clamp the signals containing the DC restored signal at the $V_K$ nodes to ground. Thus even though the clamping pulses move the voltage $V_3$ to a ground reference, the DC component is retained as an input to the light-emitting-diode driver $A_4$ and to integrator 68. Looking closer at voltage $V_4$, if the difference between the reference temperature level, shown at the base of the line, and the average of the video signal $V_{A4}$ is too great, amplifiers $A_2$, $A_3$, and $A_4$ and the LED may saturate. Therefore, in order to maximize the dynamic range of the video signal, the reference temperature level must be controlled to the same level as the average voltage $V_{A4}$. Since $V_{A4}$ is proportion to the integral of the voltages at the $V_K$ nodes from time zero to a time $T_1$, or $$V_{A4} = \frac{1}{T_1} \int_0^{T_1} V_4(t) dt,$$

where $T_1$ is one active period. $V_4(t)$ is integrated at every line period to control the temperature of the reference temperature strip 56. However, since each video channel has different average voltages $V_{A4}$, the channel having the maximum average video signal is the channel selected for control of strip 56. The target giving the maximum average voltage $V_{A4}$ is generally close to terrain temperature. The terrain temperature average is mostly in the hottest range of targets. The probability of a detector viewing a hot road for whole line period of the scan is very small. Also, a very hot point source in a line can not contribute much voltage change in an average level. Therefore, the maximum average voltage from the hottest target video channel for controlling reference temperature strip 56 level is the method used.

The concept of sampling the maximum average video signal to control the reference temperature strip 56 can be implemented in a common module thermal imaging systems as discussed hereinbelow with reference to FIG. 3. In operation, video channel signals are clamped during the dead time of the scan by clamp pulses applied at terminal 10 to the base electrode of switching transistors $S_1$, $S_2$, $S_3$, and $S_4$. Every fifth channel is clamped. However, the number of channels selected to control the reference temperature strips may be more or less than five. The reference temperature control signal is obtained by integrating the active time signals at the $V_K$ nodes of the selected channels. These voltages at selected nodes $V_{K5}$, $V_{K10}$, $V_{K15}$, etc. are an input respectively to integrators 68, 78 and 88. A positive bias voltage $V_B$ is applied to terminal 12 connected as a second input to the integrators. Voltage $V_B$ maintains the output voltages from the integrators positive no matter what the reference temperature level voltages at the $V_K$ nodes are above or below the video channel signal average level.

Refer now to channel 5 for discussion of an integrated output voltage from the 5th video channel integrator 68. However, when all the integrator output voltages are compared to determine the largest average video channel signals, all the integrators will be discussed. The magnitude of the output voltage of integrator 68 is $$V_{o5} = \int_0^{T_1} (V_B - V_{S5})dt$$

where $T_1$ is an active scan period, $V_B$ is a positive bias input voltage and $V_{S5}$ is the signal voltage at mode $V_{K5}$.

The voltage gain between the voltage divider 30 and diode 31 is $$V_{G5} = \frac{1}{T_1}\int_0^{T_1} (V_B - V_{S5})dt = \frac{1}{T_1}T_1V_B - \frac{1}{T_1}\int_0^{T_1} V_{S5}dt = V_B - V_{S5} \text{ average}$$

The voltage gain is always positive at the output of all integrators. Only the largest voltage gain, represented by $$(V_B - V_{AVE}) | \text{MAX} |$$

will charge the resistor 40 — capacitor 38 network 39 to the maximum voltage. This largest voltage gain, shown by lead line 28, is applied as one input to inverting signal amplifier 50. Amplifier 50 has a gain of $K_1$. A negative bias voltage $-V_B$ is applied to terminal 13 as a second input to amplifier 50. The negative bias voltage $-V_B$ at terminal 13 cancels the positive bias voltage $V_B$ applied to the integrators at terminal 12. Thus, the output voltage of amplifier 50 is $$-K_1V_{AVE} | \text{MAX} |$$

which is further amplified by a power amplifier 52 having a gain of $K_2$. The output of amplifier 52 is $$K_1K_2V_{AVE} | \text{MAX} |$$

The output of amplifier 52 controls a thermo-electric cooler 54 which, in turn, controls the temperature of the reference temperature strip 56. The selected every fifth detector views the strip 56 of the IR window 58 during the overscan of the window 58. Therefore, a reference temperature is established during dead time of the thermal imager that is commensurate with the temperature of the targets being viewed.

While there has been shown and described what is considered the preferred embodiment, it will be apparent to those skilled in the art that various changes and modifications may be made therein without departing from the scope of the invention as defined by the appended claims.

I claim:
1. A DC restoration and automatic reference temperature level system for a thermal imager comprising:
   a scanner having an oscillating reflecting mirror;
   an afocal lens system for receiving radiation from a target image reflected from said mirror and sweeping said radiation on a plurality of detectors;
   a plurality of video channels connected at the output from said plurality of detectors for transmitting video signals therethrough;
   a plurality of integrators;
   a voltage clamping means connected to a common terminal of said plurality of video channels, said common terminal is clamped to ground periodically at a point where there is a long time constant during the unclamped time and a short time constant during the clamped time to provide a DC voltage restoration and wherein said common terminal comprises an input to a plurality of light-emitting-diode circuits and a first input to said plurality of integrators;
   a positive voltage bias connected as a second input to said plurality of integrators;
   a comparator circuit for comparing the outputs from said plurality of integrators and for selecting the largest average voltage over the integrated active period when the plurality of video channels are unclamped;
   a video signal amplifier for amplifying said largest average voltage;
   a thermo-electric cooler controlled by the output from said video signal amplifier; and
   an IR window having a reference temperature strip thereon positioned at the focal plane of said afocal lens and having an input to said reference temperature strip from said thermo-electric cooler for establishing a reference temperature on said strip during dead time of said imager that is commensurate with said target temperature during the active time of said imager to prevent suppressive streaking of a cold target image by a hot target image.

2. A system as set forth in claim 1 wherein voltage clamping means comprises a plurality of transistors having collector electrodes connected to said common terminal in said plurality of video channels, emitter electrodes connected to ground, and base electrodes connected to a common terminal upon which clamp voltage pulses that are synchronized with said scanner are applied to produce alternate dead time and active time for said video signals.

3. A system as set forth in claim 2 wherein said plurality of transistors are N-P-N transistors and said clamp voltage pulses are of positive polarity during the dead time.

4. A system as set forth in claim 3 wherein said plurality of integrators produce a positive voltage output that is the difference between said positive voltage bias and said plurality of active time video signals.

5. A system as set forth in claim 4 wherein said comparator circuit comprises a voltage divider network at the output of each of said plurality of integrators and a parallel resistor-capacitor network which stores said largest average voltage during each of said repetitive integration periods.

6. A system as set forth in claim 5 wherein said largest average voltage comprises said positive voltage bias minus the most negative average voltage from said voltage clamping means common terminal.

7. A system as set forth in claim 5 wherein said video signal amplifier comprises a voltage signal amplifier and a power amplifier in series, said voltage signal amplifier having a negative voltage bias equal to said positive voltage bias as one input and said largest average voltage as a second input resulting in an amplified largest average voltage.

* * * * *